United States Patent
Seki et al.

(10) Patent No.: US 10,249,866 B2
(45) Date of Patent: Apr. 2, 2019

(54) STORAGE BATTERY MODULE

(71) Applicant: HONDA MOTOR CO., LTD., Tokyo (JP)

(72) Inventors: Hidemi Seki, Wako (JP); Noboru Yusaku, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 552 days.

(21) Appl. No.: 14/712,915

(22) Filed: May 15, 2015

(65) Prior Publication Data
US 2015/0333305 A1 Nov. 19, 2015

(30) Foreign Application Priority Data
May 19, 2014 (JP) .................. 2014-103232

(51) Int. Cl.
| | |
|---|---|
| *H01M 2/20* | (2006.01) |
| *H01M 2/10* | (2006.01) |
| *H01M 10/613* | (2014.01) |
| *H01M 10/625* | (2014.01) |
| *H01M 10/6551* | (2014.01) |
| *H01M 10/6554* | (2014.01) |

(52) U.S. Cl.
CPC ......... *H01M 2/206* (2013.01); *H01M 2/1077* (2013.01); *H01M 10/613* (2015.04); *H01M 10/625* (2015.04); *H01M 10/6551* (2015.04); *H01M 10/6554* (2015.04); *H01M 2220/20* (2013.01)

(58) Field of Classification Search
None
See application file for complete search history.

(56) References Cited

U.S. PATENT DOCUMENTS

| | | | | |
|---|---|---|---|---|
| 2013/0009464 A1* | 1/2013 | Firehammer | ....... | H01M 10/425 307/9.1 |
| 2013/0244089 A1* | 9/2013 | Shimizu | ............ | H01M 2/1016 429/176 |
| 2014/0113171 A1* | 4/2014 | Schaefer | ............ | H01M 2/1077 429/120 |
| 2015/0024253 A1* | 1/2015 | Noh | .................... | H01M 2/1016 429/156 |
| 2015/0030915 A1* | 1/2015 | Seong | .................... | H01M 2/06 429/179 |
| 2015/0357690 A1* | 12/2015 | Bader | ................. | H01M 10/615 429/120 |
| 2016/0036022 A1* | 2/2016 | Tononishi | ......... | H01M 10/6555 429/53 |

FOREIGN PATENT DOCUMENTS

JP 2012-256466 12/2012

* cited by examiner

*Primary Examiner* — Carmen V Lyles-Irving
(74) *Attorney, Agent, or Firm* — Mori & Ward, LLP

(57) ABSTRACT

A storage battery module includes a storage battery group, first and second end plates, a coupling band, and a pressing device. The storage battery group includes storage batteries stacked in a stacking direction and has a first end and a second end opposite to the first end in the stacking direction. The first and second end plates are provided at the first and second ends, respectively. The coupling band couples the first and second end plates to each other. The pressing device includes pin-shaped members pressing the storage batteries in a pressing direction and a fixing portion fixing the pin-shaped members to the coupling band.

28 Claims, 13 Drawing Sheets

STORAGE BATTERY MODULE

CROSS-REFERENCE TO RELATED APPLICATIONS

The present application claims priority under 35 U.S.C. § 119 to Japanese Patent Application No. 2014-103232, filed May 19, 2014, entitled "Storage Battery Module." The contents of this application are incorporated herein by reference in their entirety.

BACKGROUND

1. Field

The present disclosure relates to a storage battery module.

2. Description of the Related Art

A known storage battery module generally includes a storage battery group (battery module) as a stack of storage batteries (battery cells). This storage battery module is mounted on, for example, a hybrid vehicle or a motor-driven vehicle such as an electric vehicle (EV), and thus, a large number of storage batteries need to be installed in the vehicle without fail.

A battery module disclosed in Japanese Unexamined Patent Application Publication No. 2012-256466, for example, includes a pair of rectangular end plates between which a stack of rectangular battery cells (storage batteries) is held at both ends in the stacking direction of the battery cells. Each of the end plates has an inner wall surface contacting the battery cells and an outer peripheral surface that is continuous with the outer periphery of the inner wall surface and faces a fixing object member. The outer peripheral surface is provided with a fixing portion that fixes the end plate to a member to be fixed. The fixing portion includes a first fixing portion and a second fixing portion oriented in a direction intersecting the direction in which the first fixing portion is oriented.

Thus, it is possible to select a fixing mode in which the first fixing portion is fixed to the member to be fixed or a fixing mode in which the second fixing portion is fixed to the member to be fixed, depending on vehicle body space. This configuration enables the battery module to be fixed to the member to be fixed in two different positions.

SUMMARY

According to one aspect of the present invention, a storage battery module includes a storage battery group, end plates, a coupling band, and a pressing device. Storage batteries are stacked in a stacking direction in the storage battery group. The end plates are located at both ends in the stacking direction of the storage battery group. The coupling band couples the end plates to each other. The pressing device presses the storage battery group. The pressing device includes pin-shaped members configured to press the storage batteries in an identical direction and a fixing portion that fixes the pin-shaped members to the coupling band.

According to another aspect of the present invention, a storage battery module includes a storage battery group, first and second end plates, a coupling band, and a pressing device. The storage battery group includes storage batteries stacked in a stacking direction and has a first end and a second end opposite to the first end in the stacking direction. The first and second end plates are provided at the first and second ends, respectively. The coupling band couples the first and second end plates to each other. The pressing device includes pin-shaped members pressing the storage batteries in a pressing direction and a fixing portion fixing the pin-shaped members to the coupling band.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
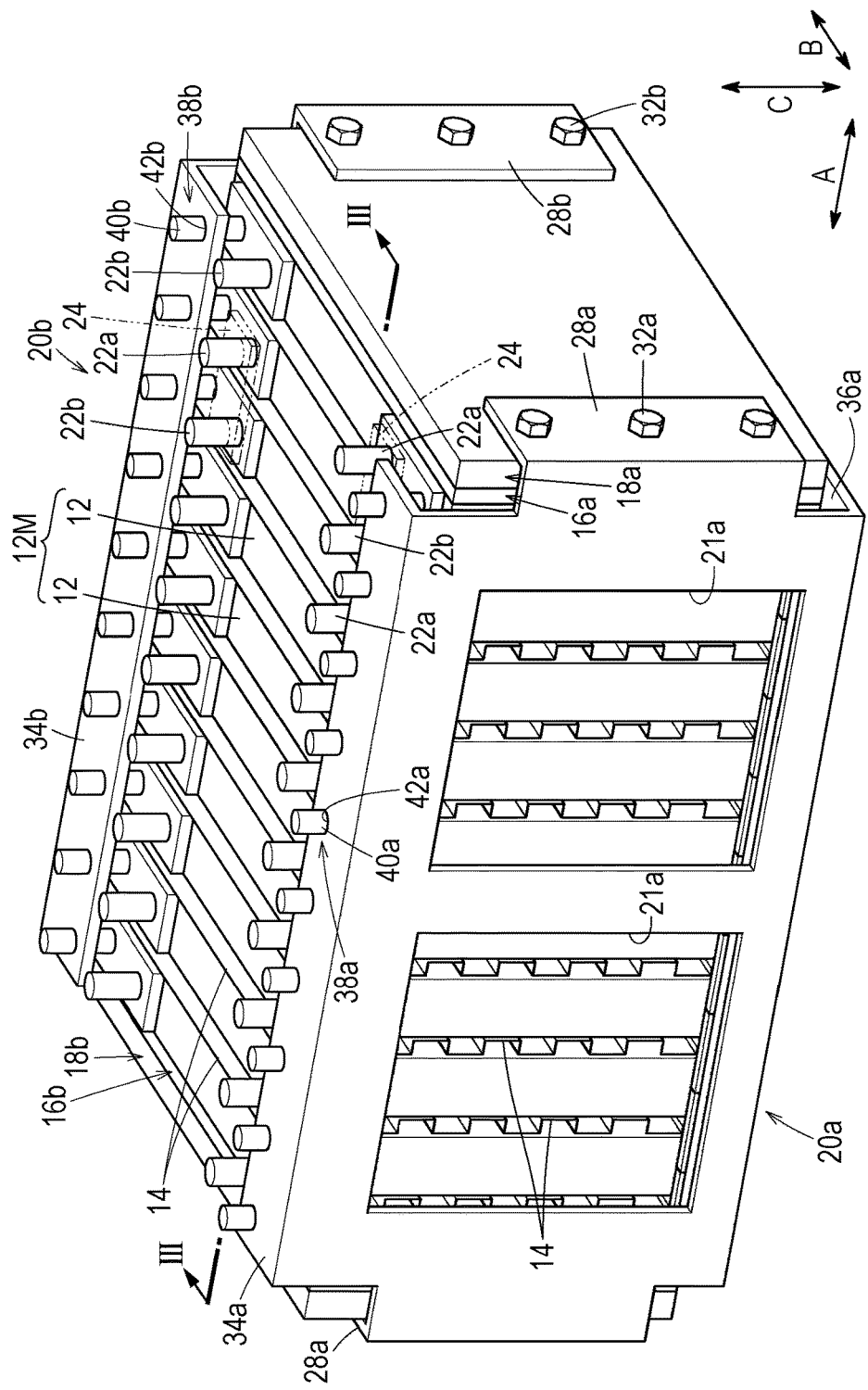
FIG. 1 is a perspective view schematically illustrating a storage battery module according to a first embodiment of the present disclosure.

The embodiments will now be described with reference to the accompanying drawings, wherein like reference numerals designate corresponding or identical elements throughout the various drawings.

Figure 2:
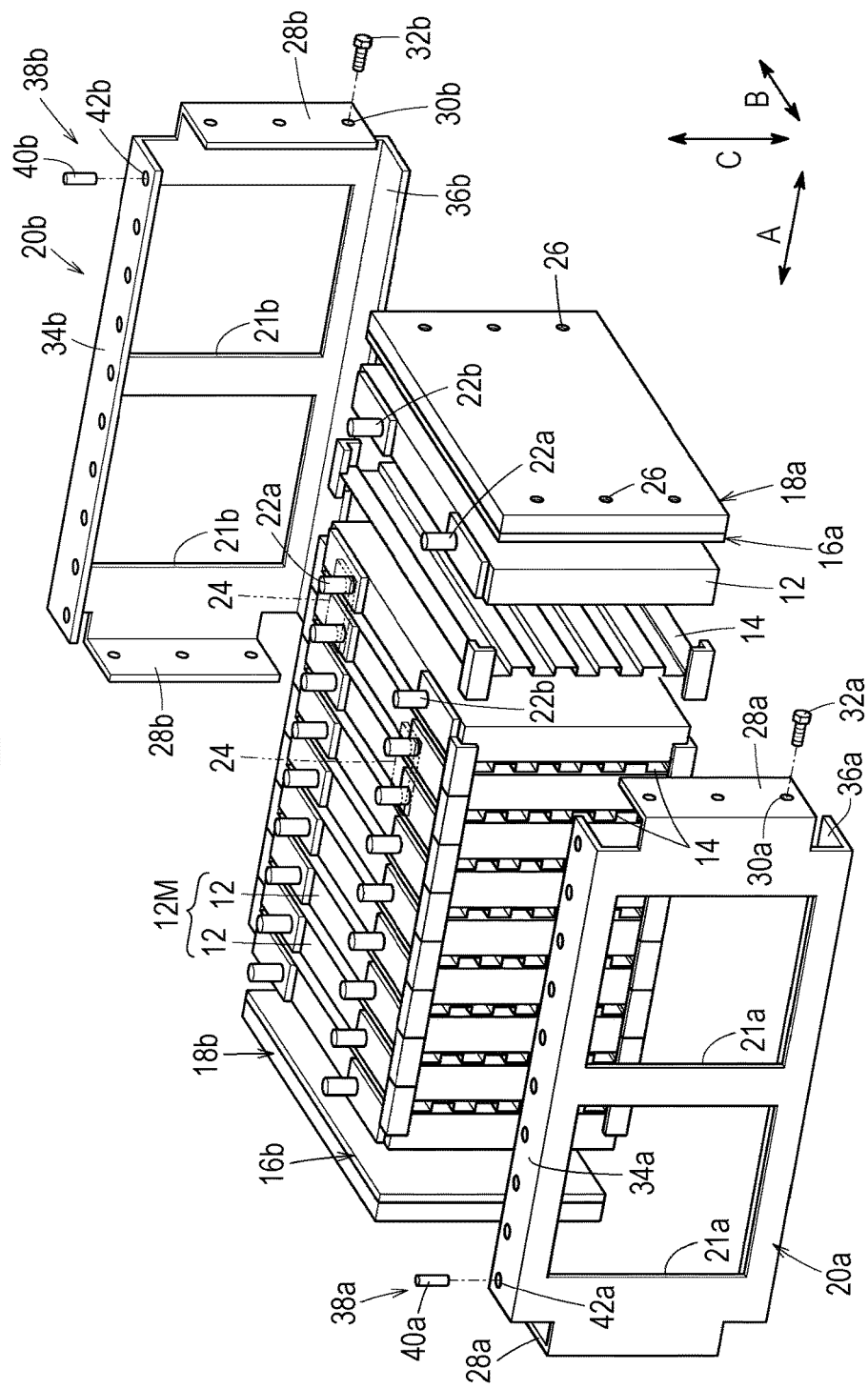
FIG. 2 is a disassembled perspective view illustrating a main portion of the storage battery module.

As illustrated in FIGS. 1 and 2, a storage battery module 10 according to a first embodiment of the present disclosure is installed in, for example, a hybrid automobile or a motor-driven vehicle such as an EV (not shown).

The storage battery module 10 includes a storage battery group (battery module) 12M in which storage batteries (battery cells) 12 are stacked horizontally (along arrow A). Each of the storage batteries 12 is rectangular and is in an upright position. The storage batteries 12 and insulating separators (holders) 14 are alternately stacked along arrow A.

As illustrated in FIG. 2, rectangular (or square) end plates 18a and 18b are disposed at respective ends in the stacking direction of the storage battery group 12M with insulator plates (or separators 14) 16a and 16b sandwiched therebetween. The end plates 18a and 18b are coupled to each other by, for example, a pair of coupling bands 20a and 20b disposed at respective ends in the direction of arrow B and extending along arrow A (see FIGS. 1 and 2).

The storage batteries 12 are, for example, lithium ion batteries, and rectangular (or square). The upper surface of each of the storage batteries 12 is provided with a positive (or negative) terminal 22a and a negative (or positive) terminal 22b. The terminals 22a and 22b of adjacent ones of the storage batteries 12 are electrically connected to each other by a bus bar 24.

The insulator plates 16a and 16b are substantially flat (or may be in a shape similar to that of the separators 14). The end plates 18a and 18b are substantially flat, and screw holes 26 are vertically aligned in either end portion in the direction of arrow B of the end plates 18a and 18b.

As illustrated in FIGS. 1 and 2, the coupling band 20a is constituted by a horizontally elongated sheet metal (metal plate) and, when necessary, has openings 21a for weight reduction and for cooling of the storage batteries 12 by introducing refrigerant therethrough. The coupling band 20a has a U-shape in cross section in a front view seen from an end in the stacking direction of the storage battery group 12M. End portions 28a and 28a of the coupling band 20a in the longitudinal direction (along longer sides) thereof cover shorter sides of the end plates 18a and 18b and are disposed on the plate surface.

Each end portion 28a has a plurality of holes 30a that are vertically aligned. The holes 30a are coaxially disposed with the screw holes 26 of the end plates 18a and 18b. Screws 32a are inserted into the holes 30a and threaded into the screw holes 26, thereby fixing the end portions 28a of the coupling band 20a to the end plates 18a and 18b.

An upper bent portion 34a and a lower bent portion 36a that extend vertically and then bend horizontally inward are respectively located at upper and lower ends of the coupling band 20a. The bent portions 34a and 36a extend along the stacking direction of the storage battery group 12M such that the bent portion 36a holds a lower corner of the storage battery group 12M.

Figure 3:
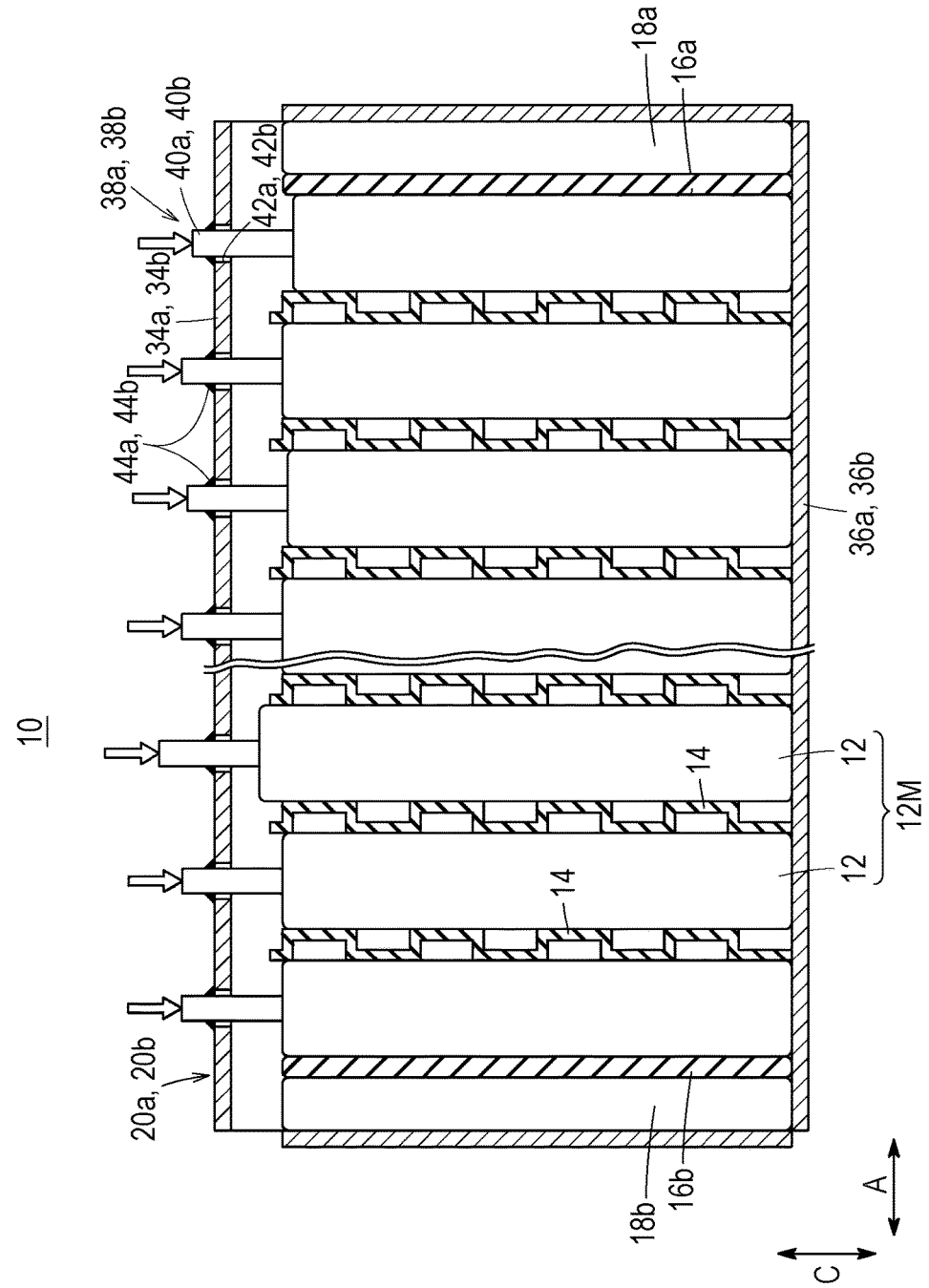
FIG. 3 is a cross-sectional view of the storage battery module taken along line in FIG. 1.

The bent portion 34a is provided with a pressing device 38a for pressing the storage battery group 12M. The pressing device 38a includes pins (pin-shaped members) 40a that press the storage batteries 12 in the same direction (downward along arrow C) and holes (openings) 42a corresponding to the pins 40a and penetrating the coupling band 20a. As illustrated in FIG. 3, each of the holes 42a is located at substantially the center in the width direction (along arrow A) of the upper surface of a corresponding one of the storage batteries 12.

The pins 40a are inserted into the holes 42a and fixed to the bent portion 34a of the coupling band 20a by, for example, welding, thereby providing a fixing portion 44a. The fixing portion 44a may be provided by, for example, bonding as well as welding.

The coupling band 20b is configured in a manner similar to that of the coupling band 20a described above. The same components are designated by adding b to reference numerals instead of a, and detailed description thereof will not be repeated.

In fabricating the thus-configured storage battery module 10, the storage batteries 12 are stacked and the end plates 18a and 18b are disposed at both ends in the stacking direction of the storage batteries 12 with the insulator plates 16a and 16b sandwiched therebetween. The end portions 28a and 28b of the pair of coupling bands 20a and 20b are fixed to the end plates 18a and 18b with the screws 32a and 32b.

Referring now to FIGS. 1 to 3, the pins 40a and 40b constituting the pressing devices 38a and 38b are inserted into the holes 42a and 42b of the bent portions 34a and 34b of the coupling bands 20a and 20b. The holes 42a and 42b disposed along arrow B face the edges at both ends of the upper surfaces of the storage batteries 12. The pins 40a and 40b inserted into the holes 42a and 42b are in contact with the edges at both ends of the upper surfaces of the storage batteries 12.

Thus, the pins 40a and 40b are fixed to the bent portions 34a and 34b by, for example, welding while being pressed onto the edges at both ends of the upper surfaces of the storage batteries 12 under a predetermined compressive force, thereby providing the fixing portions 44a and 44b. This process is repeatedly performed for each of the storage batteries 12.

In this case, in the first embodiment, the storage batteries 12 are pressed in the same direction (downward along arrow C) by means of the pins 40a and 40b through the holes 42a and 42b formed in the coupling bands 20a and 20b. Accordingly, independently of the influence of dimensional variations, the surfaces (second side surfaces) of the storage batteries 12 opposite to the surfaces (first side surfaces) facing the pressing devices 38a and 38b can be aligned on a continuous flat plane along the bent portions 36a and 36b.

The pins 40a and 40b are fixed to the coupling bands 20a and 20b by, for example, welding, thereby providing the fixing portions 44a and 44b. Accordingly, the entire storage battery group 12M can be oriented with a proper alignment, and the entire storage battery module 10 can be reduced in size and weight.

Figure 4:
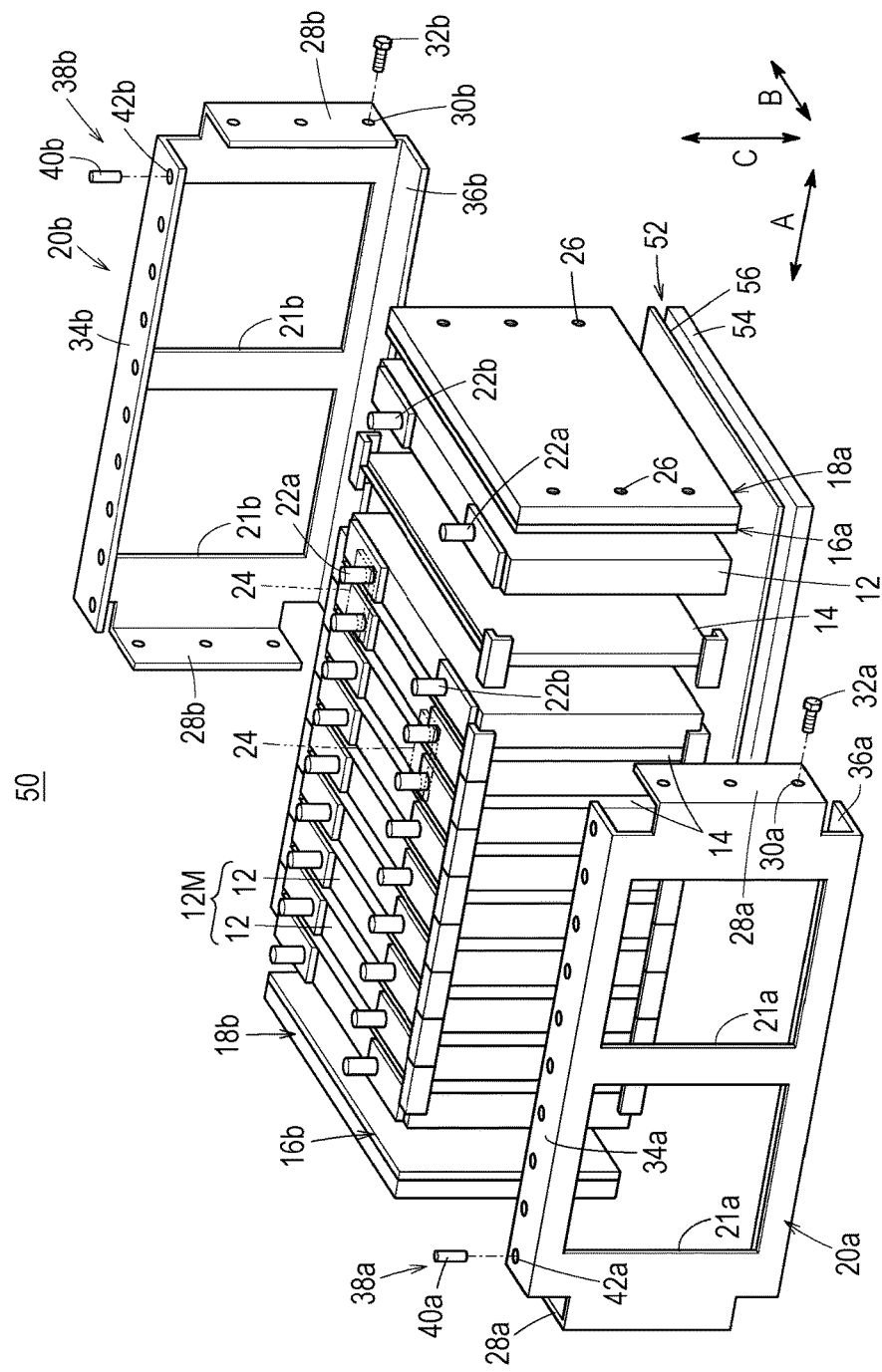
FIG. 4 is a disassembled perspective view illustrating a main portion of a storage battery module according to a second embodiment of the present disclosure.

FIG. 4 is a disassembled perspective view illustrating a main portion of a storage battery module 50 according to a second embodiment of the present disclosure. Components already described for the storage battery module 10 of the first embodiment are denoted by the same reference characters, and detailed description thereof is not repeated. Similarly, detailed description of such components will not be repeated, either, in the third and subsequent embodiments below.

Figure 5:
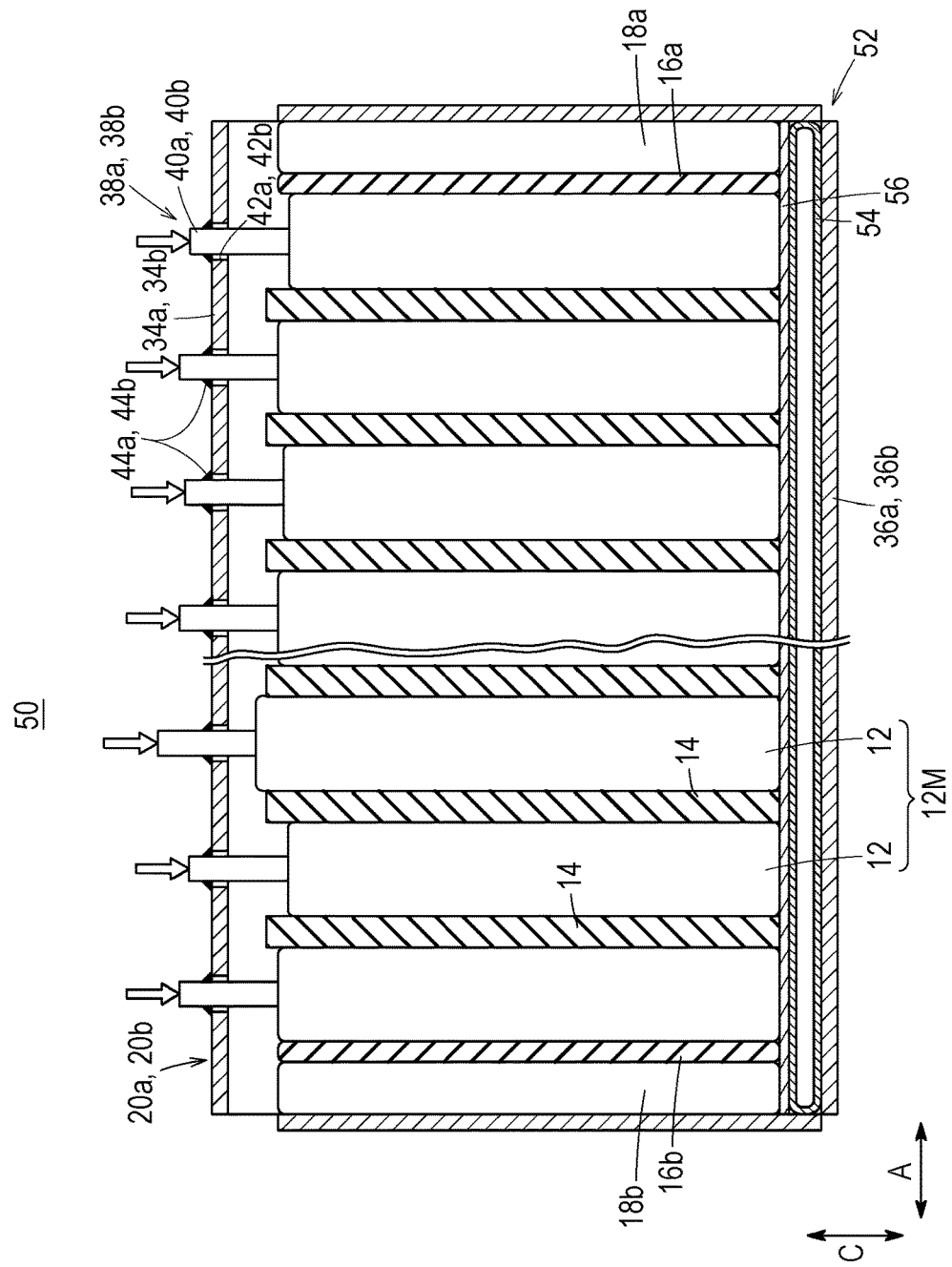
FIG. 5 is a cross-sectional view illustrating the storage battery module.

In the storage battery module 50, a heat conduction cooling device 52 contacting the storage battery group 12M is disposed at the bottom surface (the second side surface opposite to the first side surface facing the pressing devices 38a and 38b) of the storage battery group 12M. As illustrated in FIGS. 4 and 5, the heat conduction cooling device 52 includes, for example, a heatsink (e.g., water-cooled heatsink) 54 mounted on the bent portions 36a and 36b. A heat conduction sheet 56 is disposed on the heatsink 54 when necessary. The heat conduction sheet 56 is directly in contact with the bottom surface of the storage battery group 12M.

In this configuration of the second embodiment, as illustrated in FIG. 5, the storage batteries 12 are pressed toward the heat conduction cooling device 52 through the pressing devices 38a and 38b. Thus, even with the use of storage batteries 12 having different cell dimensions, such storage batteries 12 can be easily brought into contact with the heat conduction sheet 56 (or the heatsink 54) without fail. Accordingly, it is possible to suitably reduce separation of one or more of the storage batteries 12 from the heat conduction sheet 56 that causes degradation of, for example, durability of the storage batteries 12. This configuration advantageously ensures that the storage batteries 12 are held within a desired temperature range.

Figure 6:
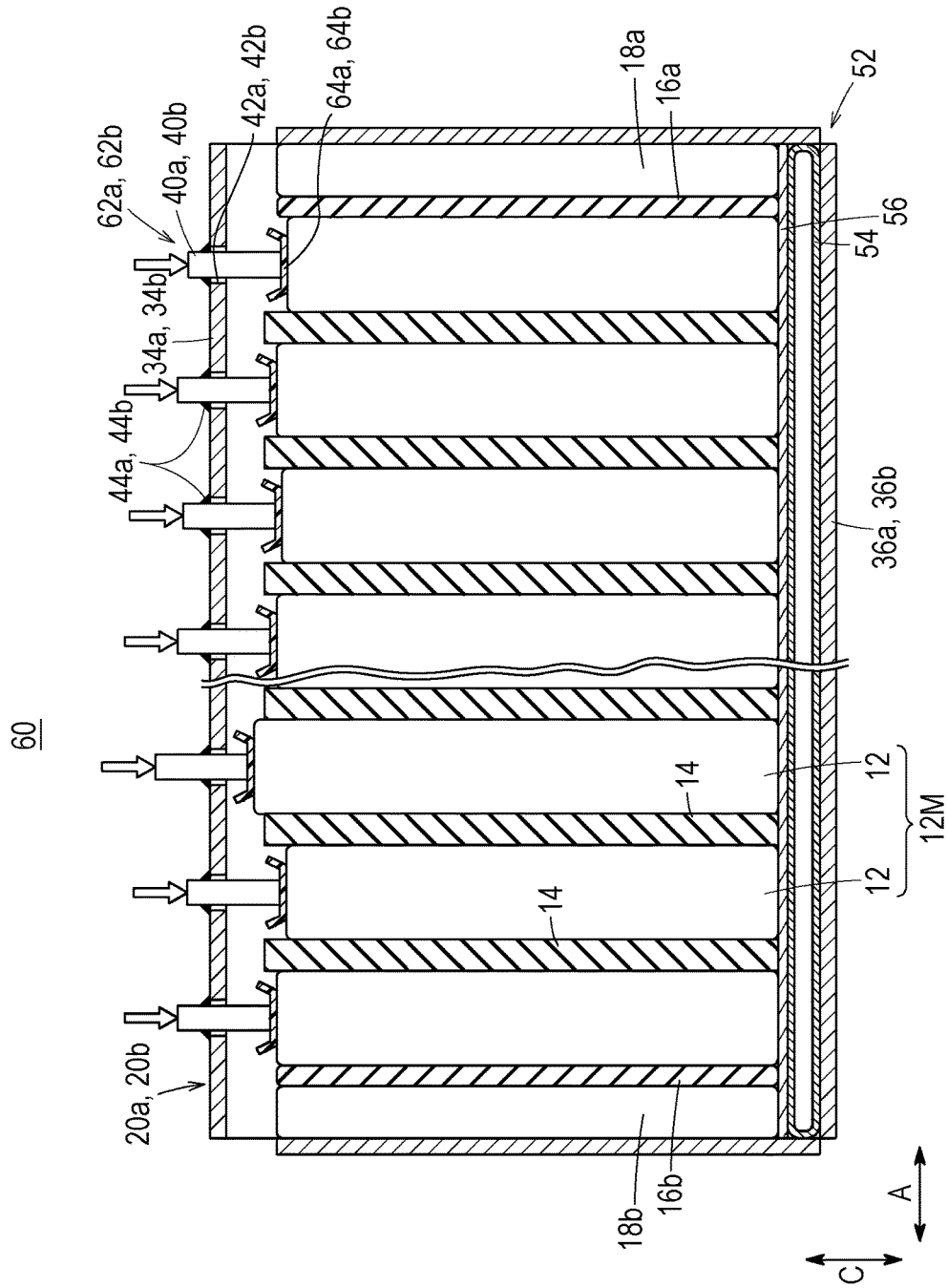
FIG. 6 is a partial cross-sectional view illustrating a storage battery module according to a third embodiment of the present disclosure.

As illustrated in FIG. 6, a storage battery module 60 according to a third embodiment of the present disclosure has a configuration basically similar to that of the second embodiment. Components already described in the second embodiment are denoted by the same reference characters, and detailed description thereof will not be repeated.

The storage battery module 60 includes pressing devices 62a and 62b. The pressing devices 62a and 62b include electrical insulating cups (insulating members) 64a and 64b between the pins 40a and 40b and the upper surfaces of the storage batteries 12. The electrical insulating cups 64a and 64b may be individually formed, or may be formed as one unit.

Thus, in the third embodiment, electrical insulating properties between the metal pins 40a and 40b and the storage batteries 12 can be increased as much as possible with a simple configuration.

Figure 7:
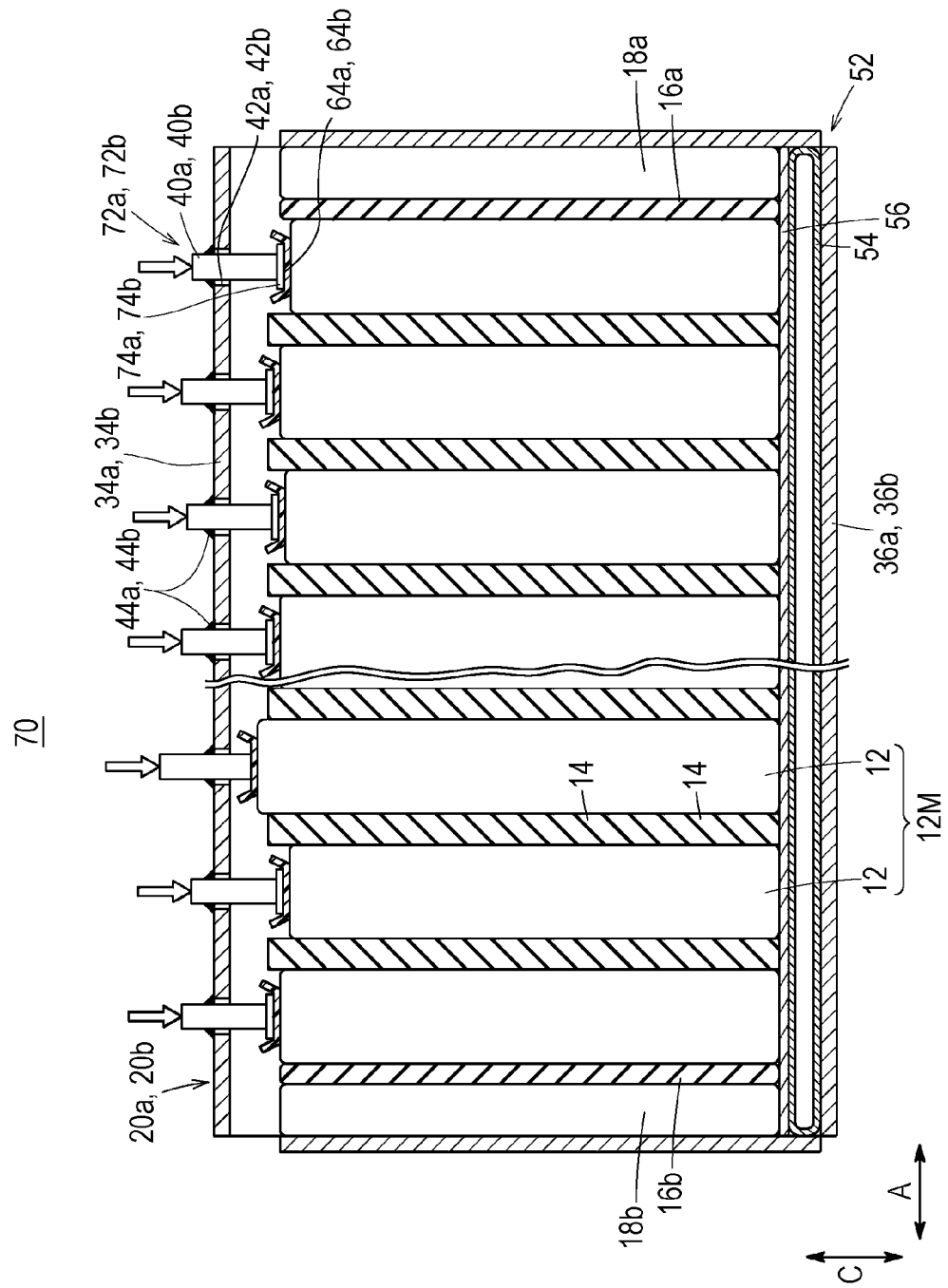
FIG. 7 is a partial cross-sectional view illustrating a storage battery module according to a fourth embodiment of the present disclosure.

As illustrated in FIG. 7, a storage battery module 70 according to a fourth embodiment of the present disclosure has a configuration basically similar to that of the third embodiment. Components already described in the third embodiment are denoted by the same reference characters, and detailed description thereof will not be repeated.

The storage battery module 70 includes pressing devices 72a and 72b. The pressing devices 72a and 72b are located between the pins 40a and 40b and the storage batteries 12 and include disk members (plate-like members) 74a and 74b that are in contact with the electrical insulating cups 64a and 64b in contact areas larger than those of the pins 40a and 40b.

As described above, in the fourth embodiment, the disk members 74a and 74b are sandwiched between the pins 40a and 40b and the storage batteries 12. Thus, contact pressure (stress) applied from the pins 40a and 40b to the storage batteries 12 can be dispersed, thereby reducing damage to the storage batteries 12 as much as possible.

Figure 8:
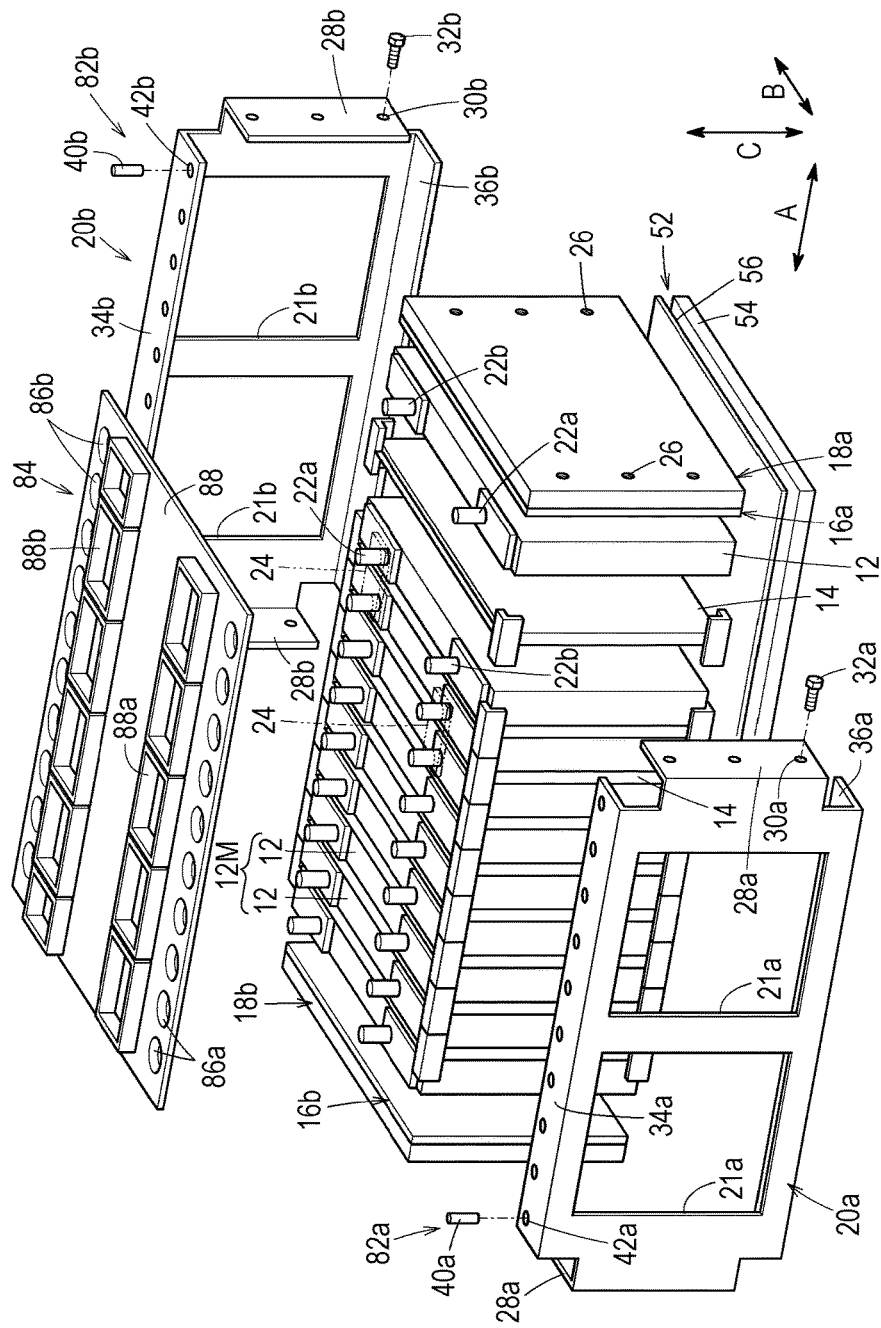
FIG. 8 is a disassembled perspective view illustrating a main portion of a storage battery module according to a fifth embodiment of the present disclosure.

As illustrated in FIG. 8, a storage battery module 80 according to a fifth embodiment of the present disclosure includes pressing devices 82a and 82b. The pressing devices 82a and 82b include a single insulating member 84 disposed along the upper surface of the storage battery group 12M. The insulating member 84 has, for example, a thin plate shape and is formed of, for example, polypropylene.

The insulating member 84 includes pin holders 86a and 86b that respectively receive pins 40a and 40b and a bus bar plate 88 provided with bus bars 24 electrically connecting the storage batteries 12 to each other. The pin holders 86a and 86b and the bus bar plate 88 are provided as one unit.

Figure 9:
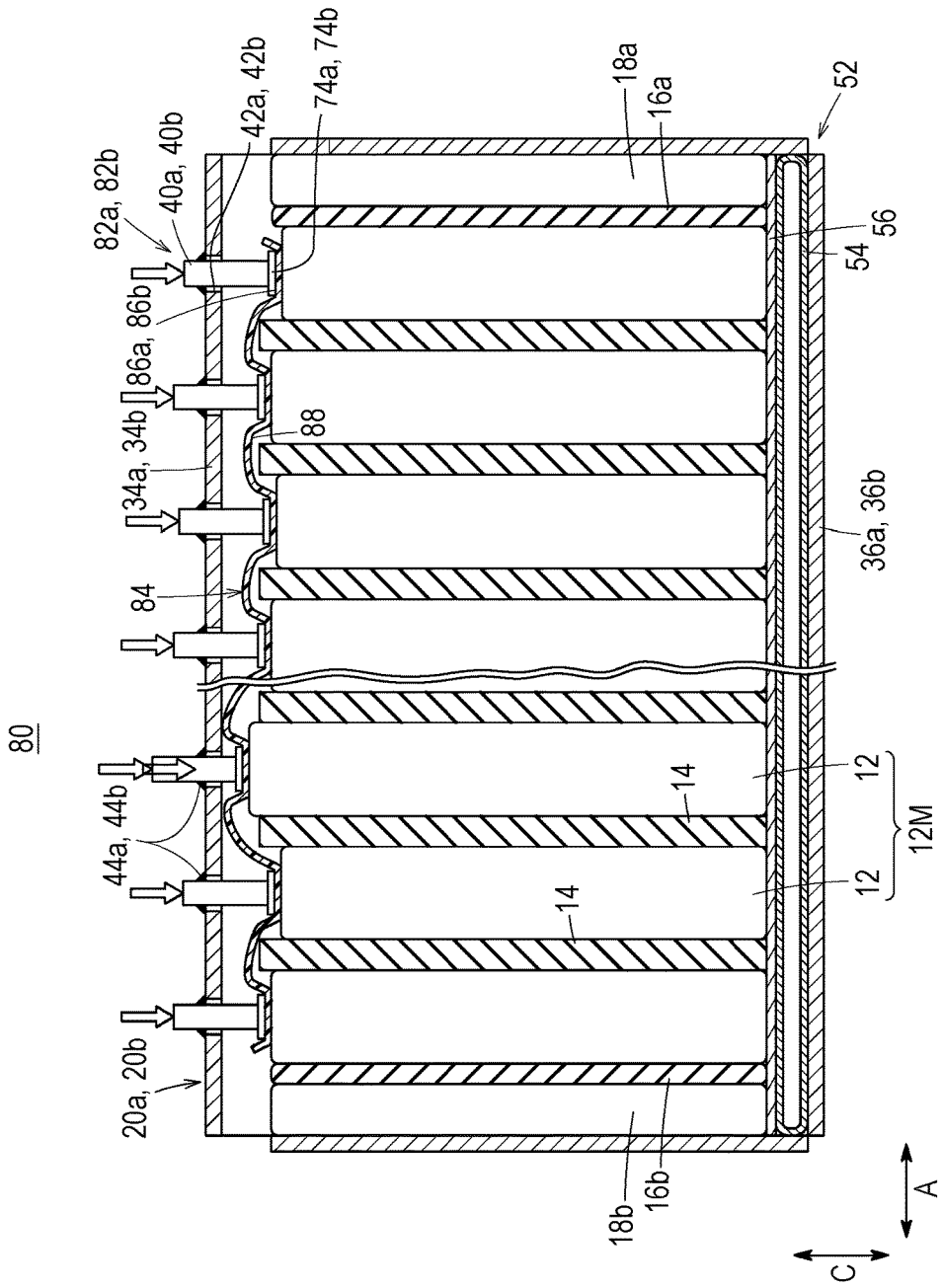
FIG. 9 is a cross-sectional view illustrating the storage battery module.

The bus bar plate 88 is provided with a plurality of partitions 88a and 88b in which the bus bars 24 are to be placed and which are arranged in lines along arrow A. The boundary between the pin holders 86a and 86b and the bus bar plate 88 is thin, and the pin holders 86a and 86b are individually deformable relative to the bus bar plate 88 (see FIG. 9).

In this configuration of the fifth embodiment, the pin holders 86a and 86b and the bus bar plate 88 are provided as one unit in the insulating member 84. Thus, the number of components can be significantly reduced, and processes of assembling the storage battery module 80 can be simplified at the same time.

Figure 10:
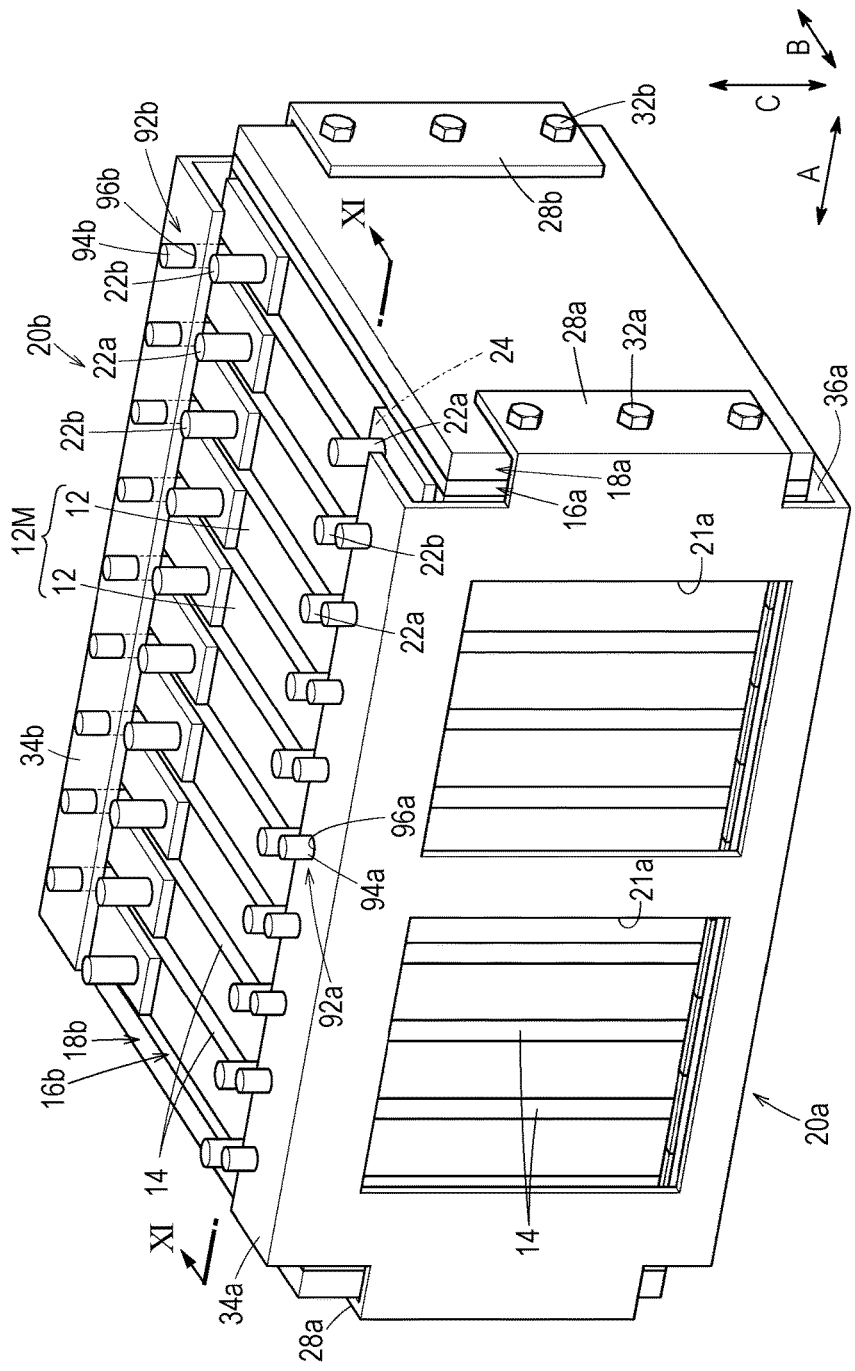
FIG. 10 is a perspective view schematically illustrating a storage battery module according to a sixth embodiment of the present disclosure.
Figure 11:
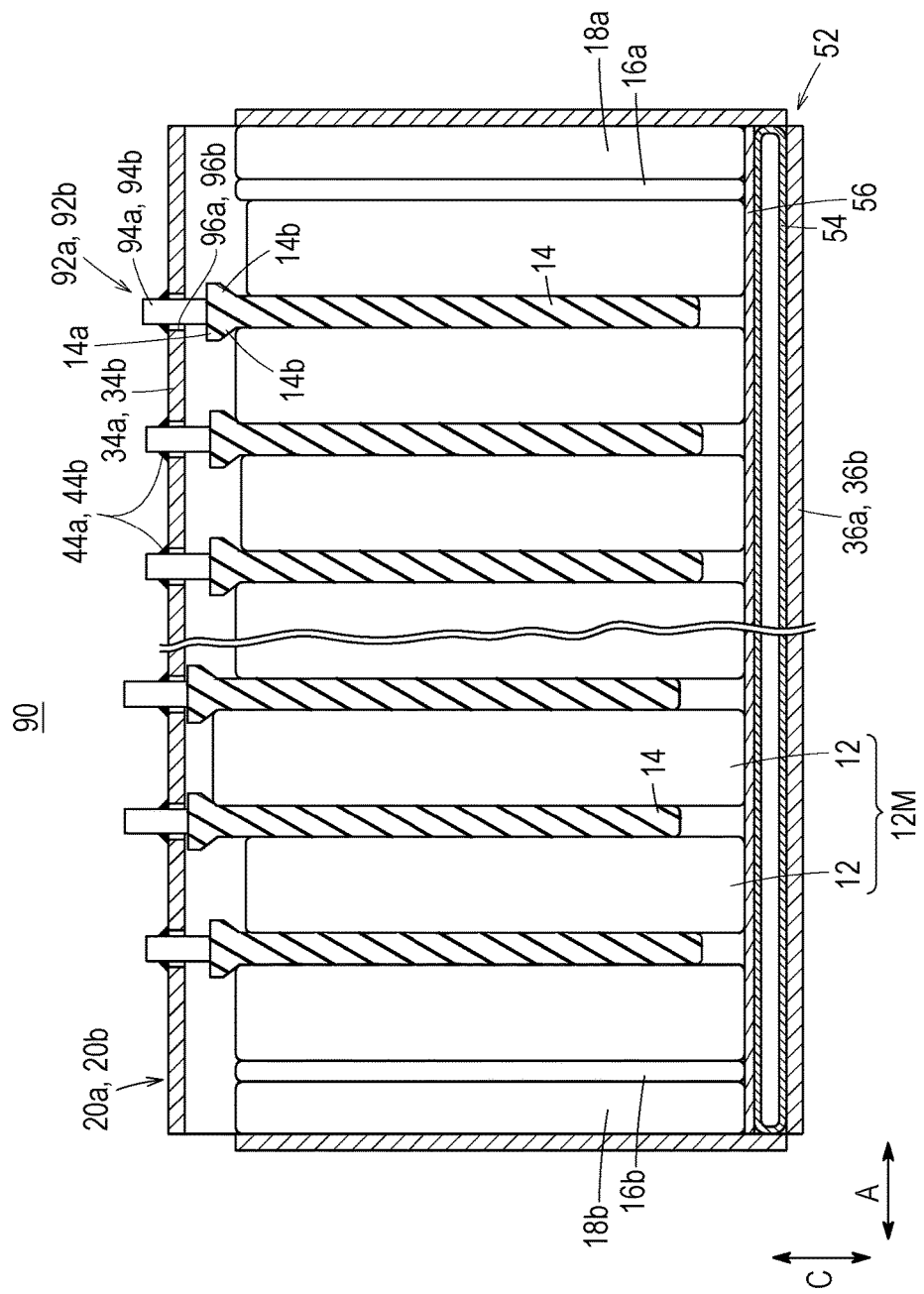
FIG. 11 is a cross-sectional view of the storage battery module taken along line XI-XI in FIG. 10.

As illustrated in FIG. 10, a storage battery module 90 according to a sixth embodiment of the present disclosure includes pressing devices 92a and 92b. The pressing devices 92a and 92b include pins (pin-shaped members) 94a and 94b that press the separators 14 downward along arrow C. As illustrated in FIG. 11, the coupling bands 20a and 20b have holes (openings) 96a and 96b corresponding to portions 14a to be pressed (hereinafter referred to as pressed portions 14a) in the separators 14 penetrating the coupling bands 20a and 20b.

The pressed portions 14a have wide flat plate shapes and are located in upper portions of the separators 14. Burrs 14b that press the storage batteries 12 are formed on the back surfaces of the pressed portions 14a.

In this configuration of the sixth embodiment, the edges at both ends of the pressed portions 14a of the separators 14 are pressed downward along arrow C by the pins 94a and 94b. Thus, the burrs 14b on the back surfaces of the pressed portions 14a are in contact with adjacent shoulders of the upper surfaces of the storage batteries 12.

Accordingly, the storage batteries 12 are pressed downward along arrow C and aligned along the heat conduction sheet 56, and the storage batteries 12 are in contact with, and pressed by, the burrs 14b between adjacent ones of the storage batteries 12. Thus, the surfaces of the storage batteries 12 facing the heat conduction sheet 56 are aligned on a continuous flat plane as a whole, and fixed such that the storage batteries 12 cannot move along the stacking direction. As a result, in the sixth embodiment, advantages similar to those of the first through fifth embodiments can be obtained. Since the pressed portions 14a are allowed to have functions similar to those of the burrs 14b, the burrs 14b may be omitted.

Figure 12:
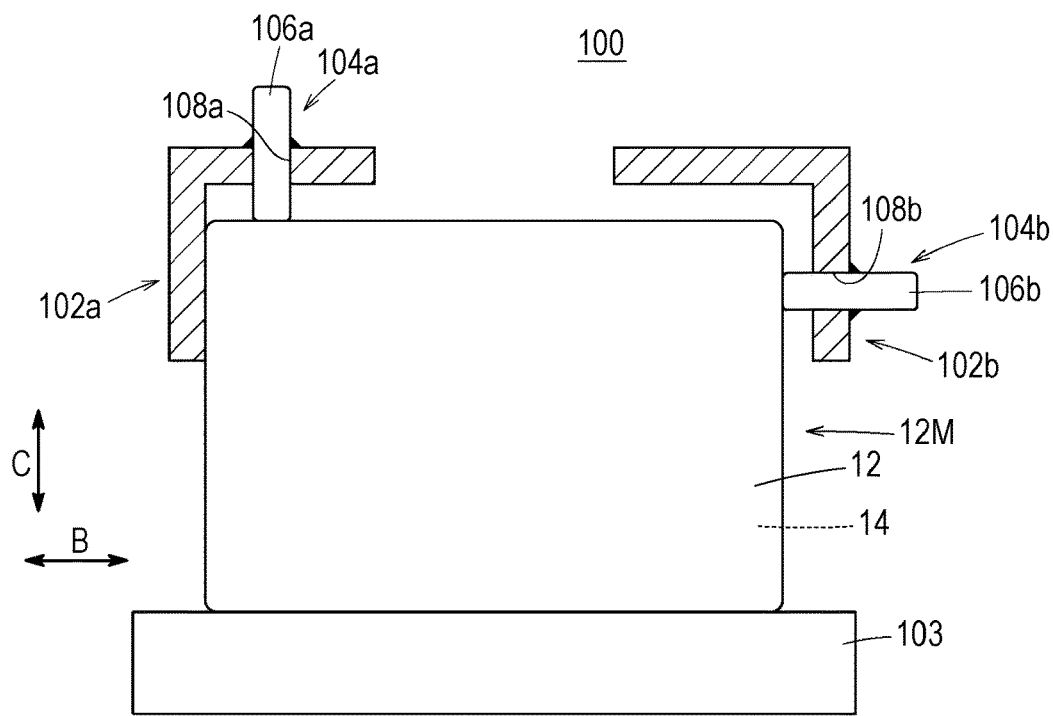
FIG. 12 is a front view seen from an end of a storage battery module according to a seventh embodiment of the present disclosure.

As illustrated in FIG. 12, a storage battery module 100 according to a seventh embodiment of the present disclosure includes a pair of coupling bands 102a and 102b. The coupling bands 102a and 102b have L-shapes in cross section in a front view seen from an end in the stacking direction of the storage battery group 12M. The storage battery group 12M is mounted on, for example, a base frame 103, and pressing devices 104a and 104b are provided near upper corners of the base frame 103.

The pressing device 104a includes a pin (pin-shaped member) 106a that presses an upper corner of the storage batteries 12 (or separators 14) downward along arrow C and a hole (opening) 108a vertically penetrating a horizontal flat plate portion of the coupling band 102a. The pressing device 104b includes a pin (pin-shaped member) 106b that presses a side upper corner of the storage batteries 12 (or separators 14) in one direction (toward the coupling band 102a) along arrow B and a hole (opening) 108b horizontally penetrating a vertical flat plate portion of the coupling band 102b.

The pressing devices 104a and 104b may be selected from the pressing devices 62a and 62b of the third embodiment through the pressing devices 82a and 82b of the sixth embodiment.

In this configuration of the seventh embodiment, advantages similar to those of the first through sixth embodiments can be obtained.

Figure 13:
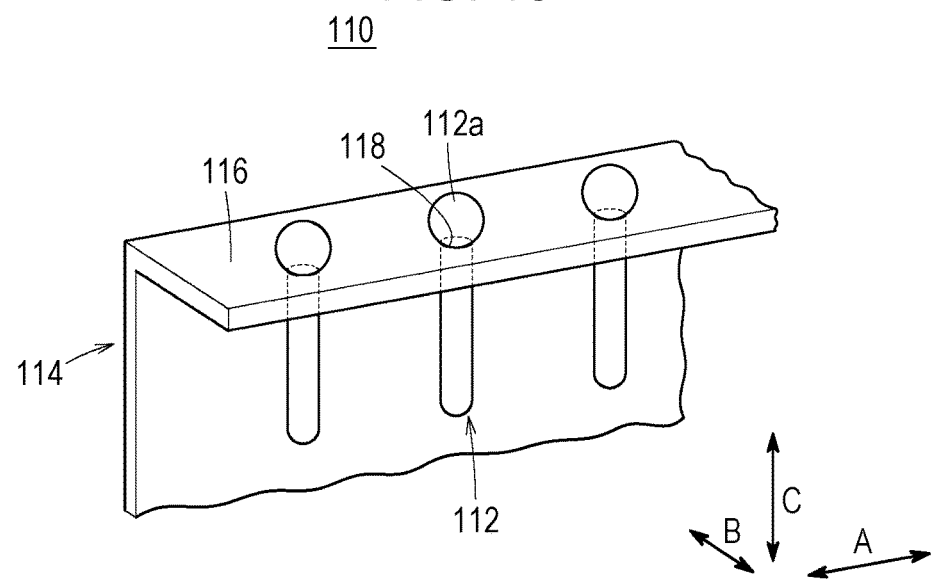
FIG. 13 is a perspective view schematically illustrating a pressing device constituting a storage battery module according to an eighth embodiment of the present disclosure.

FIG. 13 is a perspective view schematically illustrating a pressing device 110 constituting a storage battery module according to an eighth embodiment of the present disclosure.

The pressing device 110 includes pins (pin-shaped members) 112 and holes (openings) 118 formed in a bent portion 116 of a coupling band 114. Stopper ends 112a whose cross-sectional areas are larger than those of the holes 118 of the coupling band 114 are provided at the upper ends of the pins 112. The stopper ends 112a are formed by deforming end portions of the pins 112.

In this configuration of the eighth embodiment, the pins 112 are held at the bent portion 116 of the coupling band 114 and can slide through the holes 118. Thus, processability especially of the pins 112 can be further enhanced.

Figure 14:
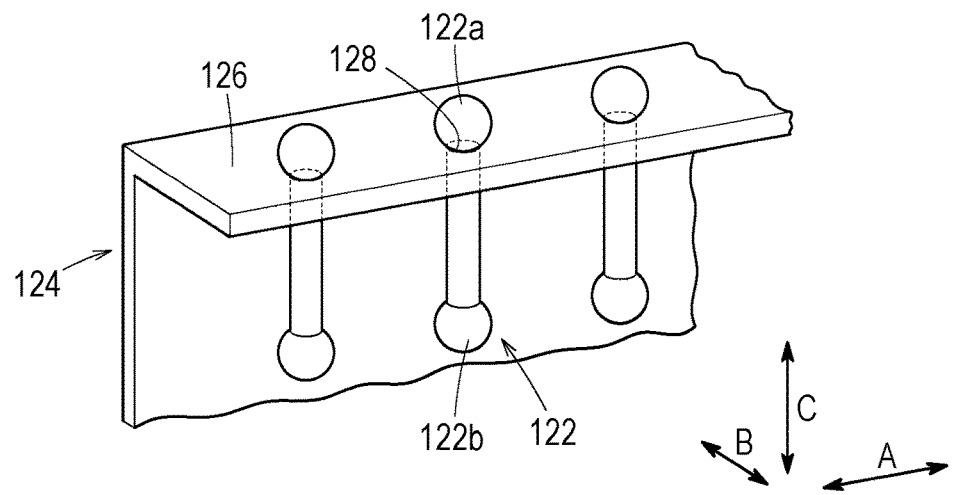
FIG. 14 is a perspective view schematically illustrating a pressing device constituting a storage battery module according to a ninth embodiment of the present disclosure.

FIG. 14 is a perspective view schematically illustrating a pressing device 120 constituting a storage battery module according to a ninth embodiment of the present disclosure.

The pressing device 120 includes pins (pin-shaped members) 122 and holes (openings) 128 formed in a bent portion 126 of a coupling band 124. Stopper ends 122a whose cross-sectional areas are larger than those of the holes 128 of the coupling band 124 are provided at the upper ends of the pins 122. Stopper ends 122b whose cross-sectional areas are larger than those of the holes 128 are also provided at the lower ends of the pins 122. The stopper ends 122a and 122b are formed by deforming end portions of the pins 122.

In this configuration of the ninth embodiment, the pins 122 are held at the bent portion 126 of the coupling band 124 and can slide but are not detachable through the holes 128. Thus, processability, especially of the pins 112, can be further enhanced.

Figure 15:
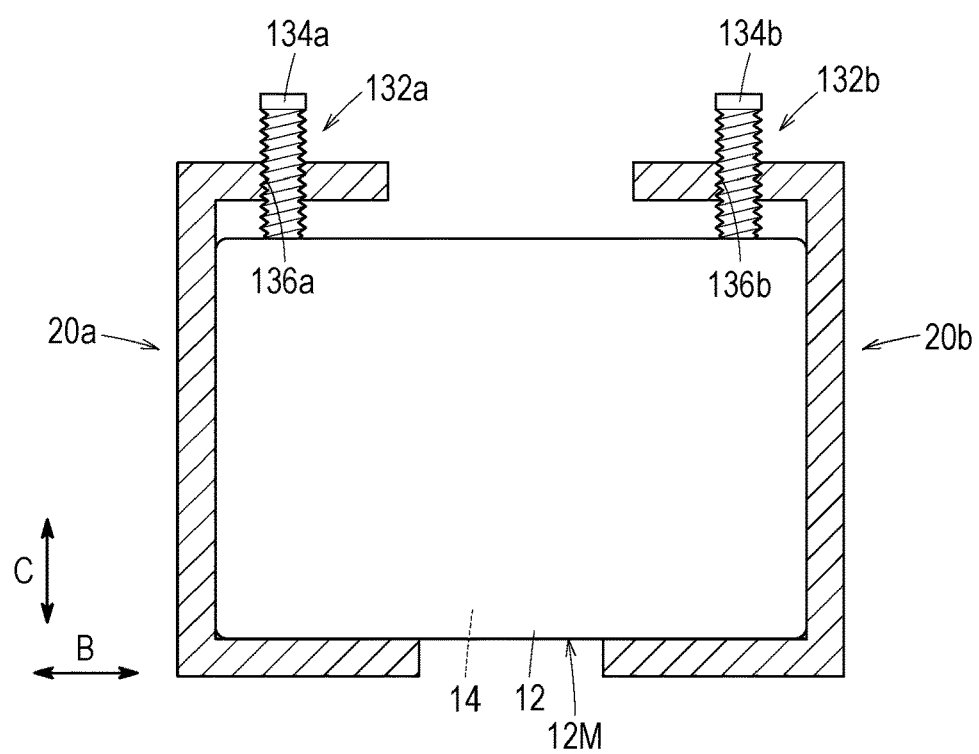
FIG. 15 is a front view seen from an end of a storage battery module according to a tenth embodiment of the present disclosure.

As illustrated in FIG. 15, a storage battery module 130 according to a tenth embodiment of the present disclosure includes pressing devices 132a and 132b. The pressing devices 132a and 132b include external thread members (pin-shaped members) 134a and 134b that press the storage batteries 12 (or separators 14) downward along arrow C. The coupling bands 20a and 20b have internal thread holes (openings) 136a and 136b penetrating the coupling bands 20a and 20b along arrow C.

In this configuration of the tenth embodiment, the external thread members 134a and 134b are screwed into the internal thread holes 136a and 136b, thereby pressing the storage batteries 12 (or separators 14) with the tips of the external thread members 134a and 134b. In this manner, the entire storage battery group 12M can be oriented with a proper alignment, and the entire storage battery module 130 can be reduced in size and weight.

In the foregoing embodiments, the pin-shaped members are inserted into the through holes (openings) in the coupling bands, but the present disclosure is not limited to these embodiments. For example, the pin-shaped members may be directly welded to the coupling bands. Alternatively, notches may be formed in the coupling bands so that the pin-shaped members can be directly welded to the inner surfaces of the notches.

The present application describes a storage battery module including: a storage battery group in which storage batteries are stacked in a stacking direction; end plates located at both ends in the stacking direction of the storage battery group; a coupling band that couples the end plates to each other; and a pressing device that presses the storage battery group, wherein the pressing device includes pin-shaped members configured to press the storage batteries in an identical direction and a fixing portion that fixes the pin-shaped members to the coupling band.

In the storage battery module, the coupling band preferably has openings corresponding to the pin-shaped members and penetrating the coupling band.

In the storage battery module, the pressing device is preferably disposed along a first side surface of the storage battery group extending along the stacking direction. In this case, a heat conduction cooling device that is in contact with the storage battery group is preferably disposed on a second side surface extending along the stacking direction of the storage battery group and opposite to the first side surface.

The pressing device preferably includes an insulating member between the pin-shaped members and the storage batteries.

The pressing device preferably includes a plate-like member disposed between the pin-shaped members and the storage batteries and contacting the insulating member over a contact area larger than that of the pin-shaped members.

The insulating member preferably includes pin holders that respectively receive the pin-shaped members and a bus bar plate provided with bus bars electrically connecting the storage batteries to each other such that the pin holders and the bus bar plate are provided as one unit. In this case, the pin holders are preferably individually deformable relative to the bus bar plate.

It is preferable that separators be disposed between the storage batteries and pressed by the pressing device so that the storage batteries are pressed and held on pressed portions of the separators under a frictional force generated between the separators and the storage batteries.

The coupling band preferably has an L-shape or a U-shape in cross section in a front view seen from one end in the stacking direction of the storage battery group.

It is preferable that the pin-shaped members be external thread members, whereas the openings are internal thread holes into which the external thread members are screwed.

At least one end of each of the pin-shaped members is preferably provided with a stopper end having a cross-sectional dimension larger than that of a corresponding one of the openings of the coupling band.

According to the present disclosure, the pin-shaped members press the storage batteries in an identical direction. Thus, independently of the influence of dimensional variations, the surfaces of the storage batteries opposite to the surfaces facing the pressing devices can be aligned on a continuous flat plane.

The pin-shaped members are fixed to the coupling band with the fixing portions by, for example, welding or screwing. Thus, the entire storage battery group can be oriented with a proper alignment, and the entire storage battery module can be reduced in size and weight.

Obviously, numerous modifications and variations of the present invention are possible in light of the above teachings. It is therefore to be understood that within the scope of the appended claims, the invention may be practiced otherwise than as specifically described herein.

What is claimed is:

1. A storage battery module comprising:
   a storage battery group in which storage batteries are stacked in a stacking direction;
   end plates located at both ends in the stacking direction of the storage battery group;
   a coupling band coupled to the end plates, thereby coupling the end plates to each other, the coupling band having an inside surface that faces upper surfaces of the storage batteries; and
   a pressing device that presses the storage battery group, wherein
   the pressing device includes pin-shaped members that extend and protrude from the inside surface of the coupling band in a direction orthogonal to the stacking direction and that press the storage batteries in an identical direction, the inside surface of the coupling band being spaced apart from the upper surfaces of the storage batteries, the pressing device including a fixing portion that fixes the pin-shaped members to the coupling band.

2. The storage battery module according to claim 1, wherein the coupling band has openings through which the pin-shaped members extend, the openings penetrating the coupling band.

3. The storage battery module according to claim 1, wherein
the pressing device is disposed along a first side surface of the storage battery group extending along the stacking direction, and
a heat conduction cooling device that is in contact with the storage battery group is disposed on a second side surface extending along the stacking direction of the storage battery group and opposite to the first side surface.

4. The storage battery module according to claim 1, wherein the pressing device includes an insulating member between the pin-shaped members and the storage batteries.

5. The storage battery module according to claim 4, wherein the pressing device is disposed between the pin-shaped members and the storage batteries and includes a plate-like member contacting the insulating member over a contact area larger than that of the pin-shaped members.

6. A storage battery module comprising:
a storage battery group in which storage batteries are stacked in a stacking direction;
end plates located at both ends in the stacking direction of the storage battery group;
a coupling band coupled to the end plates, thereby coupling the end plates to each other, the coupling band having an inside surface that faces upper surfaces of the storage batteries; and
a pressing device that presses the storage battery group, wherein
the pressing device includes pin-shaped members that extend and protrude from the inside surface of the coupling band in a direction orthogonal to the stacking direction and that press the storage batteries in an identical direction, the inside surface of the coupling band being spaced apart from the upper surfaces of the storage batteries, the pressing device including a fixing portion that fixes the pin-shaped members to the coupling band,
the pressing device includes an insulating member between the pin-shaped members and the storage batteries,
the insulating member includes pin holders that respectively receive the pin-shaped members and a bus bar plate provided with bus bars electrically connecting the storage batteries to each other,
the pin holders and the bus bar plate are provided as one unit, and
the pin holders are individually deformable relative to the bus bar plate.

7. The storage battery module according to claim 1, wherein separators are disposed between the storage batteries and pressed by the pressing device so that the storage batteries are pressed and held on pressed portions of the separators under a frictional force generated between the separators and the storage batteries.

8. The storage battery module according to claim 1, wherein the coupling band has an L-shape or a U-shape in cross section in a front view seen from one end in the stacking direction of the storage battery group.

9. The storage battery module according to claim 2, wherein
the pin-shaped members are external thread members, and the openings are internal thread holes into which the external thread members are screwed.

10. The storage battery module according to claim 2, wherein at least one end of each of the pin-shaped members is provided with a stopper end having a cross-sectional dimension larger than that of a corresponding one of the openings of the coupling band.

11. A storage battery module comprising:
a storage battery group which comprises storage batteries stacked in a stacking direction and which has a first end and a second end opposite to the first end in the stacking direction;
first and second end plates provided at the first and second ends, respectively;
a coupling band coupled to the end plates, thereby coupling the first and second end plates to each other, the coupling band having an inside surface that faces upper surfaces of the storage batteries; and
a pressing device including pin-shaped members that extend and protrude from the inside surface of the coupling band in a pressing direction orthogonal to the stacking direction, thereby pressing the storage batteries in the pressing direction, and a fixing portion fixing the pin-shaped members to the coupling band, the inside surface of the coupling band being spaced apart from the upper surfaces of the storage batteries.

12. The storage battery module according to claim 11, wherein the coupling band has openings through which the pin-shaped members extend, the openings penetrating the coupling band.

13. The storage battery module according to claim 11, wherein the pressing device is disposed along a first side surface of the storage battery group extending along the stacking direction, and
wherein a heat conduction cooling device that is in contact with the storage battery group is disposed on a second side surface of the storage battery group extending along the stacking direction and being opposite to the first side surface.

14. The storage battery module according to claim 11, wherein the pressing device includes an insulating member between the pin-shaped members and the storage batteries.

15. The storage battery module according to claim 14, wherein the pressing device includes a plate-shaped member between the pin-shaped members and the storage batteries contacting the insulating member over a contact area larger than a contact area of the pin-shaped members.

16. The storage battery module according to claim 14, wherein the insulating member includes pin holders that respectively receive the pin-shaped members and a bus bar plate provided with bus bars electrically connecting the storage batteries to each other,
wherein the pin holders and the bus bar plate are provided as one unit, and
wherein the pin holders are individually deformable relative to the bus bar plate.

17. The storage battery module according to claim 11, wherein separators are disposed between the storage batteries and pressed by the pressing device so that the storage batteries are pressed and held on pressed portions of the separators under a frictional force generated between the separators and the storage batteries.

18. The storage battery module according to claim 11, wherein the coupling band has an L-shape or a U-shape in cross section in a front view seen from one end in the stacking direction of the storage battery group.

19. The storage battery module according to claim 12, wherein the pin-shaped members comprise external thread members, and
wherein the openings comprise internal thread holes into which the external thread members are screwed.

20. The storage battery module according to claim 12, wherein at least one end of each of the pin-shaped members is provided with a stopper end having a cross-sectional dimension larger than a cross-sectional dimension of a corresponding one of the openings of the coupling band.

21. The storage battery module according to claim 2, wherein the coupling band has a hole coaxially disposed with respect to a hole in a first one of the end plates, and
wherein the openings of the coupling band extend through the coupling band in a direction orthogonal to the stacking direction.

22. The storage battery module according to claim 12, wherein the coupling band has a hole coaxially disposed with respect to a hole in the first end plate, and
wherein the openings of the coupling band extend through the coupling band in a direction orthogonal to the stacking direction.

23. The storage battery module according to claim 1, wherein the pin-shaped members extend through and protrude from the inside surface of the coupling band at respective positions that are aligned with the storage batteries in the direction orthogonal to the stacking direction.

24. The storage battery module according to claim 1, wherein
separators are disposed between the storage batteries and pressed by the pressing device, and
the pin-shaped members extend through and protrude from the inside surface of the coupling band at respective positions that are aligned with the separators in the direction orthogonal to the stacking direction.

25. The storage battery module according to claim 11, wherein the pin-shaped members extend through and protrude from the inside surface of the coupling band at respective positions that are aligned with the storage batteries in the direction orthogonal to the stacking direction.

26. The storage battery module according to claim 11, wherein separators are disposed between the storage batteries and pressed by the pressing device, and
wherein the pin-shaped members extend through and protrude from the inside surface of the coupling band at respective positions that are aligned with the separators in the direction orthogonal to the stacking direction.

27. The storage battery module according to claim 1, wherein the coupling band extends beyond the storage battery group as measured along the identical direction in which the pin-shaped members press the storage batteries.

28. The storage battery module according to claim 11, wherein the coupling band extends beyond the storage battery group as measured along the pressing direction.

* * * * *